US006903946B1

United States Patent
Wu

(10) Patent No.: US 6,903,946 B1
(45) Date of Patent: Jun. 7, 2005

(54) PARALLELED POWER FACTOR CORRECTING AC-TO-DC CONVERTERS WITH IMPROVED CURRENT BALANCE

(75) Inventor: Keng-Chih Wu, Cranbury, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 21 days.

(21) Appl. No.: 10/701,212

(22) Filed: Nov. 4, 2003

(51) Int. Cl.[7] ............................................. H02M 7/00
(52) U.S. Cl. ........................... 363/65; 363/71; 363/70
(58) Field of Search ............................. 363/65, 69, 70, 363/71, 67, 68

(56) References Cited

U.S. PATENT DOCUMENTS

| | | | | |
|---|---|---|---|---|
| 4,074,182 A | * | 2/1978 | Weischedel | 323/269 |
| 4,257,090 A | * | 3/1981 | Kroger et al. | 363/65 |
| 5,311,419 A | * | 5/1994 | Shires | 363/65 |
| 5,319,536 A | * | 6/1994 | Malik | 363/65 |
| 5,418,707 A | * | 5/1995 | Shimer et al. | 363/65 |
| 5,428,523 A | * | 6/1995 | McDonnal | 363/71 |
| 5,530,635 A | * | 6/1996 | Yashiro | 363/65 |
| 5,712,540 A | * | 1/1998 | Toda et al. | 363/58 |
| 5,768,117 A | * | 6/1998 | Takahashi et al. | 363/65 |
| 6,707,285 B2 | * | 3/2004 | Telefus et al. | 323/300 |

* cited by examiner

*Primary Examiner*—Bao Q. Vu
(74) *Attorney, Agent, or Firm*—Duane Morris LLP

(57) ABSTRACT

A power supply for a capacitive-resistive load includes plural paralleled phase correcting modules together with current sharing controllers for tending to equalize their currents. Each module is provided with a diode, poled to prevent forward current from flowing in the return current path, for aiding in equalizing module currents. Surge currents are reduced by a single saturable reactor coupled to the combined outputs of current sharing controllers, thereby avoiding the need for soft-start in each controller. A precharging path extends from a source of pulsating direct voltage to the load, for precharging the load capacitance at turn-on.

8 Claims, 7 Drawing Sheets

PARALLELED POWER FACTOR CORRECTING AC-TO-DC CONVERTERS WITH IMPROVED CURRENT BALANCE

GOVERNMENTAL INTEREST

This invention was prepared under government contract N00014-99-2-0002 (HBMRS). The United States Government has a non-exclusive, non-transferable, paid-up license in this invention.

FIELD OF THE INVENTION

This invention relates to electrical power supplies, and more particularly to paralleled power supplies in which, variously, turn-on surge currents are controlled, unidirectional return current equalization is assured, and a capacitive load is precharged.

BACKGROUND OF THE INVENTION

It is often necessary to parallel power supplies in order to achieve a desired level of power. Such paralleling allows the use of standardized or commercial-off-the-shelf (COTS) modules or units to achieve a level of power which might otherwise require a costly custom-designed power supply. For example, most single-phase power-factor-corrected (PFC) boost AC-DC power supplies available as COTS modules offer no more than 1 KW of power capacity, and must be paralleled in order to provide, say, 10 KW. FIG. 1 is a simplified diagram in block and schematic form illustrating a prior-art paralleled power supply 10 for providing direct voltage to a capacitive load 12. In FIG. 1, the capacitive load 12 includes a load resistor 14 which represents the real or energy-absorbing portion of the load, and a paralleled capacitor 16 which represents the quadrature or out-of-phase (imaginary) portion of the load. The capacitor 16 may be an actual discrete capacitor or capacitor bank, and it may also include the stray capacitance of various components andor connections. One end of resistor 14 and capacitor 16 is connected to a load reference or ground conductor LG, and the other ends are connected to a load hot terminal LH.

In FIG. 1, a source of alternating current, such as power-line mains, is illustrated as 18. The source of alternating voltage drives a full-wave rectifier represented as a block 20, which as known produces pulsating direct voltage (also known as pulsating direct current) represented by a symbol 22. Pulsating direct voltage is characterized by unidirectional half-sinusoids of voltage, with the voltage value between voltage peaks going to approximately zero volts. The pulsating direct voltage may be viewed as being established or generated between a first common conductor 24 relative to a common second or reference conductor 26. In FIG. 1, a plurality 28 of standardized single-phase switching phase correcting power-supply boost modules $28a, 28b, \ldots, 28n$ are connected to conductors 24 and 26 for receiving pulsating direct voltage from rectifier 20, and for generating direct voltage for ultimate application to the load 12. Each power supply module of set 28 includes first and second power input terminals. More particularly, power supply $28a$ includes first and second power input terminals or ports $28ai1$ and $28ai2$, respectively, which are connected to common power conductors 24 and 26, respectively. Similarly, power supply $28b$ includes first and second power input terminals or ports $28bi1$ and $28bi2$, respectively, which are connected to common power conductors 24 and 26, respectively, and power supply $28n$ includes first and second power input ports $28ni1$ and $28ni2$, respectively, which are connected to common power conductors 24 and 26, respectively. It should be noted that the term "port" formally includes a pair of terminals or electrodes, but common usage extends the definition. Each power supply of set 28 also includes first and second power output terminals, and more particularly power supply $28a$ includes first and second output terminals $28ao1$ and $28ao2$, power supply $28b$ includes first and second output terminals $28bo1$ and $28bo2$, and power supply $28n$ includes first and second output terminals $28no1$ and $28no2$. One example of such single-phase power-factor correcting boost power supply modules is model PFC-1000 manufactured by RO Associates, Inc. of 246 Caspian Drive, P.O. Box 61419, Sunnyvale, Calif. 94088.

Each switching power supply module or element of set 28 of power supplies of FIG. 1 includes internal circuitry, which may or may not be known to the user. Such power supplies almost always include an input inductor, which is represented in FIG. 1 by inductors $28aI, 28bI, \ldots, 28nI$ connected to the first input ports $28ai1, 28bi1, \ldots, 28ni1$ of power supplies $28a, 28b, 28n$, respectively. The power supplies also often include a unidirectional current conducting device, illustrated as a diode or rectifier $28aD, 28bD, \ldots, 28nD$, through which an output or integrating capacitor is charged. In power supply $28a$ of FIG. 1, these capacitors are represented by a capacitor designated $28aC$, and capacitors $28bC$ and $28nC$ of power supplies $28b$ and $28n$ correspond. The integrating capacitor $28aC, 28bC, \ldots, 28nC$ of each of the power supply modules $28a, 28b, 28n$ is connected across the output terminals $28ao1, 28ao2; 28bo1, 28bo2; \ldots; 28no1, 28no2$ of the module, for providing a low output impedance. Each switching power supply of set 28 also includes a current sensing resistor for sensing the current flow in the return path. In FIG. 1, power supply $28a$ has a return current sensing resistor $28aR$, power supply $28b$ has a return current sensing resistor $28bR$, and power supply $28n$ has a return current sensing resistor $28nR$. The purpose of these return current sensing resistors in the various switching power supply module or element of set 28 is to provide a signal representing the return current at the second input terminal; this return current signal is compared by a comparator (not illustrated) with a scaled version of the full-wave rectified voltage 22 to produce an error signal, which error signal forces the return current to follow or track the full-wave voltage, thereby forcing the current to be in-phase with the applied voltage, which is the essence of phase correction. Each power supply $28a, 28b, \ldots, 28n$ of set 28 is also associated with a further return current equalizing resistor R1, R2, $\ldots$, Rn of a set 29 of return current equalizing resistors. More particularly, each power supply $28a, 28b, \ldots, 28n$ of set 28 is also associated with a further return current equalizing resistor R1, R2, $\ldots$, Rn, respectively, which is connected between the return current output terminal and the load ground LG. Thus, resistor R1 is connected to return current output terminal $28ao2$ of power supply $28a$ and to LG, resistor R2 is connected to return current output terminal $28bo2$ of power supply $28b$ and to LG, and resistor Rn is connected to LG and to the return current output terminal $28no2$ of power supply $28n$.

Within each switching power supply module or element of set 28 of power supplies of FIG. 1, a "line current shaping controller LCSC and associated power FET perform the boost power conversion. When the FET of a module of set 28 is ON or conducting, energy is stored in the associated input inductor ($28aI, 28bI, \ldots 28nI$) associated with the input port of the module. When the FET goes OFF or becomes nonconductive, the inductor produces a reaction voltage which adds to the input voltage to produce the boosted output voltage. At the same time, the average input port current follows the shape of the full-wave rectified or pulsating direct input voltage 22.

In theory, it should be possible to simply connect the output terminals of the various power supplies of FIG. 1 to the load 12. However, some problems arise when the power supplies are paralleled in this manner and connected to the load. A first problem is that the internal impedances of the various power supplies $28a, 28b, \ldots, 28n$ may not be equal, with the result that the current provided by each module may differ from the current provided by the other modules. Such differences in internal impedance may be the result of differences in the gain of the feedback circuits, which as known tends to change the impedance. It may also arise as a result of stray differences in connection resistances. Such current-sharing problems are controlled in the prior art by a set 30 of forward current sharing controllers, including current-sharing controllers $30a, 30b, \ldots, 30n$, which tend to maintain the same forward current to the load from each power supply module of set 28. Current-sharing controller 30a has an input port 30ai connected to output terminal 28ao1 of power supply module 28a and an output terminal 30ao connected to load conductor LH, and further includes a connection 30ar to ground conductor LG. Current-sharing controller 30b has an input port 30bi connected to output terminal 28bo1 of power supply module 28b, an output terminal 30bo, which is connected to load conductor LH, and a reference terminal 30br, which is connected to ground conductor LG. Current-sharing controller 30n has an input port 30ni connected to output terminal 28no1 of power supply module 28n, an output terminal 30no connected to load conductor LH, and a reference terminal 30nr connected to ground conductor LG. Thus, the output ports of the current sharing controllers of set 30 are connected in common to load supply conductor LH. Each of the current sharing controllers of set 30 is also connected by a reference terminal to ground conductor LG. The current sharing controllers of set 30 are of the soft ramp-up variety, to thereby prevent surge currents from occurring when the initially uncharged load capacitor 16 is connected to the charged output capacitor $28aC, 28bC, \ldots, 28nC$ of any one of the power supply modules of set 28. Such surge currents, as known, may be large enough to cause failure of a capacitor or the interconnections, or to reduce their life expectancy. FIG. 7 is a simplified diagram in schematic form of a prior-art current sharing controller 30 with soft start.

FIG. 7 is a simplified schematic diagram of a prior-art soft-start current sharing controller, together with some ancillary circuits. For definiteness, the controller of FIG. 7 is designated as 30a. In FIG. 7, current sharing controller 30a includes a power FET (PFET) having its power current controlling path connected to input terminal or port 30ai and, by way of a series current sensing resistor 710, to output terminal or port 30ao. Output port 30ao of current sharing controller 30a is connected by way of a terminal 724a to a common node 726. Other current sharing controllers (not illustrated in FIG. 7) are connected to common node 726 by way of terminals $724b, \ldots, 724n$. A current sensor 728 senses the total current supplied by all the current sharing controllers, and generates a current sense signal on a path 730. Path 730 carries information about the total current to a current share input terminal 732a.

In FIG. 7, the gate of the PFET is connected to input port 30ai by way of a resistor 712, which provides the PFET with gate voltage more positive than the voltage at output port 30ao to tend to hold the PFET conductive or ON. The gate of the PFET is also coupled to the collector of an NPN bipolar transistor 714. The emitter of transistor 714 is connected to ground by way of an emitter resistor 716. When transistor 714 is ON, collector current flows through resistor 712, and turns OFF the PFET by reducing its gate current toward zero volts. The base of transistor 714 is driven by way of a resistor 71B from the output of a comparator (a high-gain amplifier) 720. When comparator 720 tends to higher output, transistor 714 conducts more and the PFET conducts less. A current regulating arrangement includes resistor 710 and a bipolar PNP transistor 722. When the output current of current sharing controller 30a becomes large enough, the base-emitter junction of transistor 722 becomes forward biased, and the transistor becomes active. When active, transistor 722 adjusts the voltage at the positive (+) input terminal of comparator 720, to tend to drive its output positive and thereby turn OFF the PFET. The inverting (−) input terminal of comparator 720 is connected to A "startup" signal is generated by an external logic circuit (not illustrated) which uses a variety of logic schemes to determine the existence of a start-up condition, and a start-up signal is applied to the noninverting input terminal of comparator 720 by way of an intermediary FET 736.

Improved paralleled power supply arrangements are desired.

SUMMARY OF THE INVENTION

An electrical apparatus according to an aspect of the invention is for powering a load, which may include a capacitive component. The electrical apparatus comprises a source of pulsating direct voltage, and a first plurality of power factor correcting AC-to-DC switching converters units. Each of the power factor correcting AC-to-DC switching converters units includes first and second input ports coupled to the source of pulsating direct voltage, and also includes first and second output ports, and is for converting the pulsating direct voltage into a direct voltage at the first and second output terminals, and for tending to maintain the current through the source of pulsating direct voltage in-phase with the pulsating direct voltage. Each of the power factor correcting AC-to-DC switching converter units further includes first unidirectional current conducting means, such as a diode or rectifier, associated with the first output port, for resisting retrograde flow of current at the first output port. The electrical apparatus also includes a plurality, equal to the first plurality, of current sharing controllers. Each of the current sharing controllers includes an input terminal coupled to the first output terminal of an associated one of the power factor correcting AC-to-DC switching converter units, and each of the current sharing controllers also includes a reference port in common with the reference ports of all the current sharing controllers, and an output port in common with all output ports of the current sharing controllers. An output return current equalizing impedance is associated with the second output terminal of each of the power factor correcting AC-to-DC switching converter units. The equalizing impedance comprises second unidirectional current conducting means poled for resisting forward flow of current at the associated first output port of a power factor correcting AC-to-DC switching converter unit.

In an advantageous embodiment of this aspect of the invention, each of the output return current equalizing impedances comprises resistance means. In a preferred embodiment of this aspect of the invention, the power factor correcting AC-to-DC switching converter units are boost power factor correcting AC-to-DC switching converter units. In a more preferred embodiment of this aspect of the invention, a controllable path is coupled to the source of pulsating direct voltage and to the load, for tending to charge a capacitive component of the load at turn-on, and for ceasing the charge after turn-on. The controllable path may include a controllable switch, where the controllable switch may include a unidirectional current conducting device which conducts when the pulsating direct voltage is greater than the voltage on the capacitive component and which ceases conduction when the pulsating direct voltage is less than the voltage on the capacitive component. In one particularly advantageous version of this aspect of the invention, the power factor correction units are voltage-boosting units which produce a direct voltage greater than the peak value of the pulsating direct voltage, which tends to turn OFF the controllable switch. A saturable reactor may be connected between the combined output ports of the current sharing controllers and the load, for tending to oppose surge currents at turn-on.

BRIEF DESCRIPTION OF THE DRAWING

FIG. 3 is a simplified diagram similar to that of FIG. 1, showing a saturable reactor which tends to suppress surge currents at turn-on;

FIG. 5 is a simplified diagram similar to that of FIG. 1, showing the use of a controlled current path for precharging a load capacitance at turn-on;

DESCRIPTION OF THE INVENTION

Figure 1:
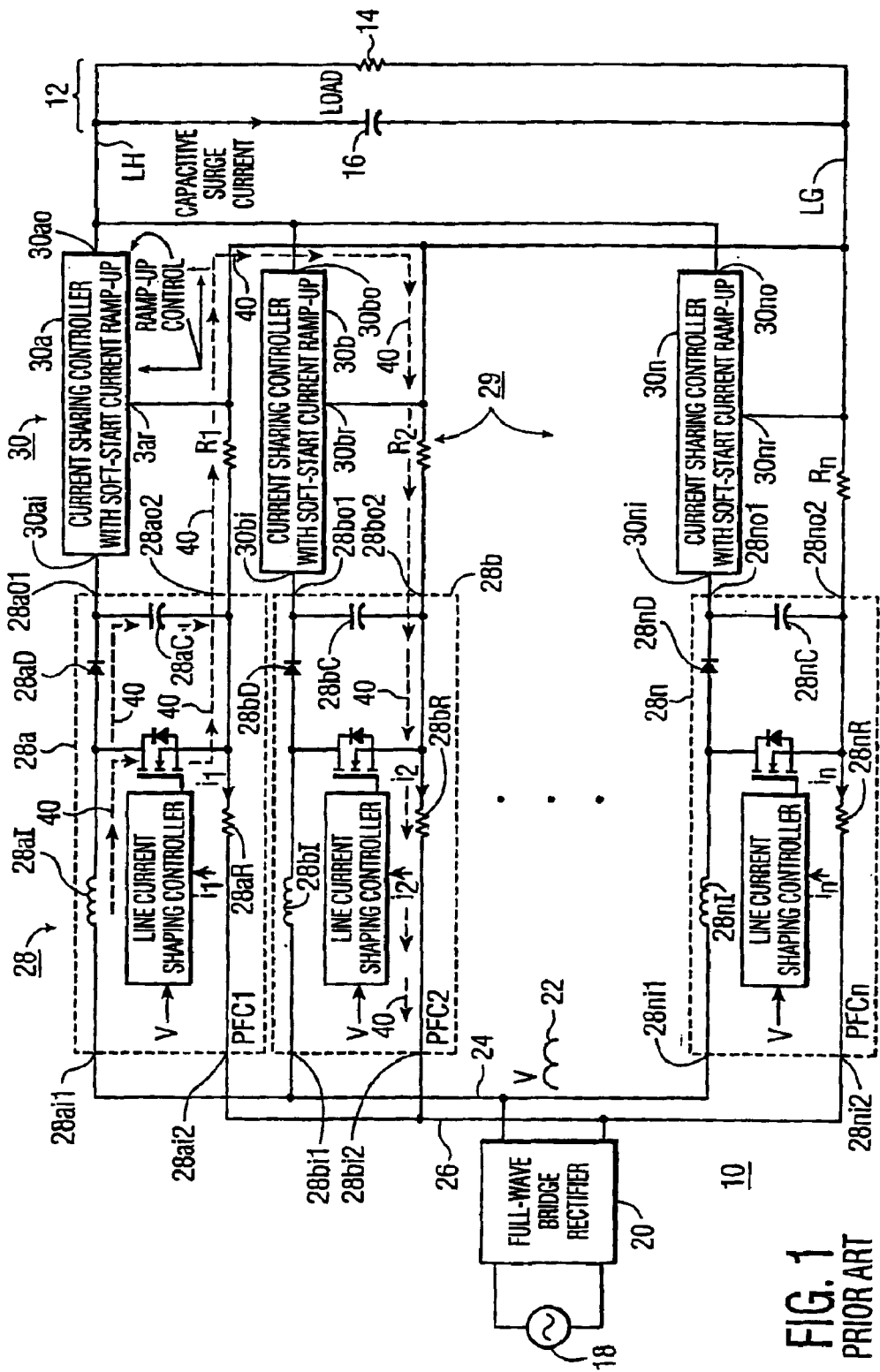
FIG. 1 is a simplified diagram of a prior-art paralleled power supply, showing unwanted paths along which forward current may flow.

It has been discovered that the arrangement of FIG. 1 may not be as stable or consistent in performance as desired. More particularly, it has been discovered that a forward cross circulation current, represented in FIG. 1 as a dash line 40, can flow from one PFC module to another, as for example from PFC module 28a to PFC module 28b, returning to conductor 26. This cross circulation current tends to disrupt the current sensing mechanism of the affected module, and eventually the AC line current shaping. In addition, the uncontrolled circulation may easily exceed the rating of the current-balancing resistors of the PFC modules, such as resistor 28bR of module 28b, for example, and lead to component destruction. Further, the cross circulation current also causes signal ground drift (reference shift) and erroneous signal processing.

Figure 2:
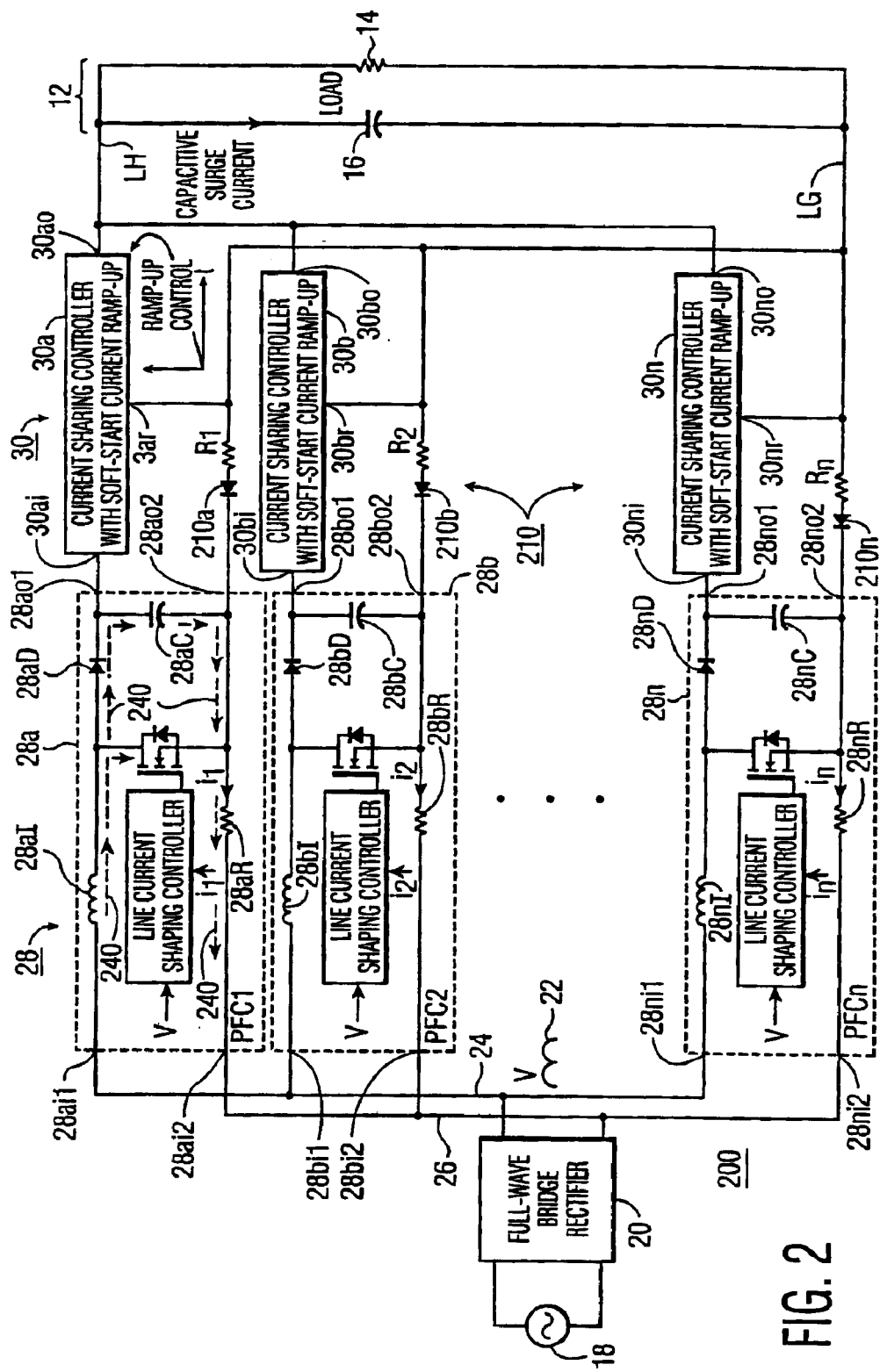
FIG. 2 is a simplified diagram of a paralleled power supply according to an aspect of the invention, in which unidirectional current conducting devices are placed so as to prevent flow of forward current among the paralleled units, and showing paths by which current flows.

According to an aspect of the invention, the circulation of cross currents from one module to the others is prevented by the use of unidirectional current conducting devices such as rectifiers or diodes (diode). In FIG. 2, a diode or rectifier of a set 210 of unidirectional current conducting devices is connected in series with a return current equalizing resistor of set 29. More particularly, a diode 210a is connected in series with resistor R1, a diode 210b is connected in series with resistor R2, and a diode 210n is connected in series with resistor Rn. The diodes of set 210 are poled to allow the flow of return current to the module in question, but prevent the flow of forward current from the second output port of each power-supply module. More particularly, diode 210a is poled with its cathode adjacent second output port 28ao of power supply module 28a, diode 210b is poled with its cathode adjacent second output port 28bo of power supply module 28b, and diode 210n is poled with its cathode adjacent second output port 28no of power supply module 28bn. With the cathodes adjacent the output return current ports, forward current cannot flow from an output return current port, and therefore cannot flow into the return current port of another power supply module. Instead, the forward current in each power-supply module of set 28 flows in a path, illustrated in conjunction with power-supply module 28a, extending from conductor 24, through the first input port 28ail of the power-supply module, through at least the internal capacitor 28aC, through the internal current sensing resistor 28aR, and out to conductor 26.

Figure 7:
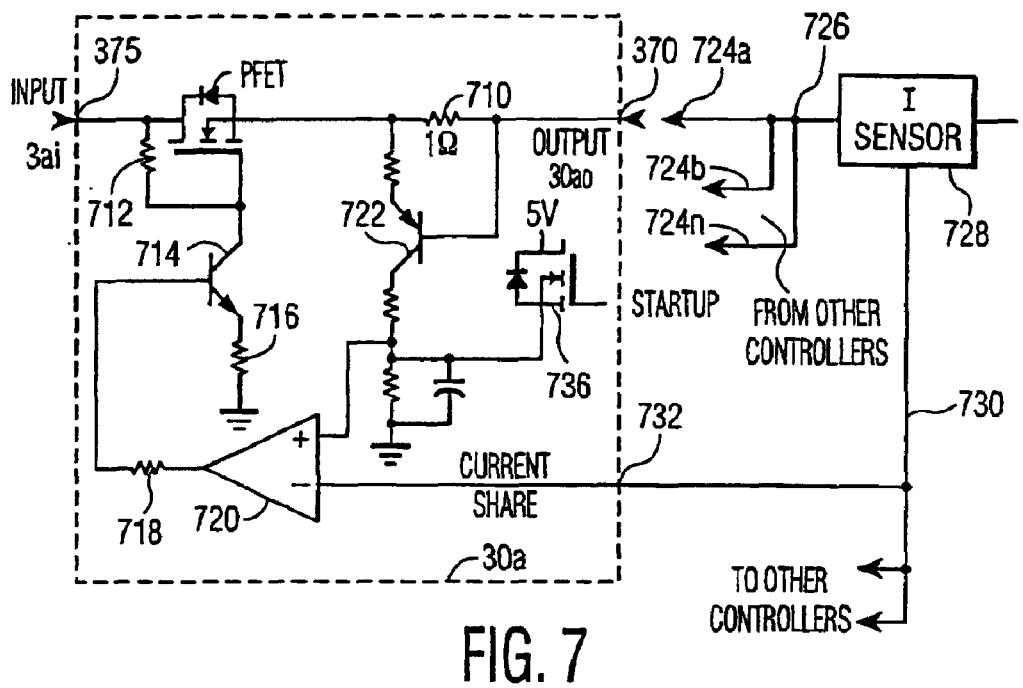
FIG. 7 is a simplified diagram in schematic form illustrating a prior-art soft-start current sharing controller which may be used in the arrangements of FIGS. 1, 2, and 5.
Figure 8:
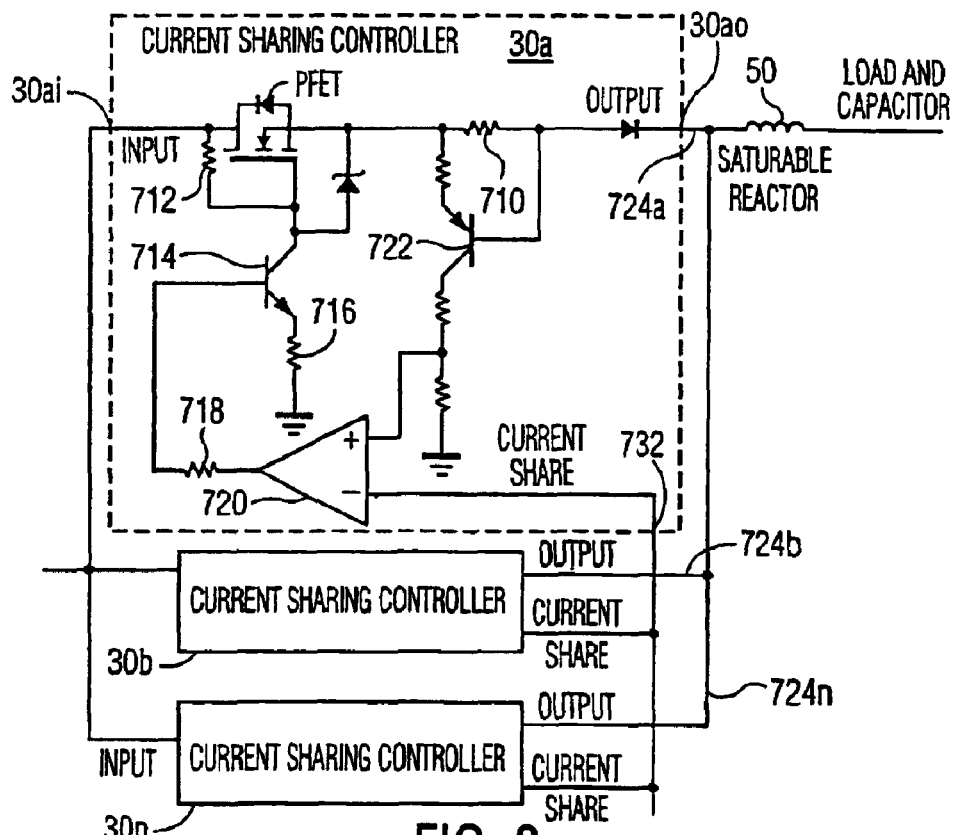
FIG. 8 is a simplified diagram in schematic form illustrating a current sharing controller arrangement which may be used in conjunction with the saturable reactor embodiment of FIG. 3.

The cost of providing soft-start current ramp-up in each of the current-sharing controllers of set 30 of FIG. 1 may be excessive. The need for soft-start current ramp-up in each current-sharing controller is avoided by the addition of a single saturable reactor between the paralleled power supply modules and the load. More particularly, referring to FIG. 3, a saturable reactor 50 is connected in series between conductor portions LH' and LH", between load 12 and the paralleled output terminals 30ao, 30bo, ..., 30no of set 30 of current sharing controllers. A saturable reactor has a magnetic core which is characterized by a BH curve 55 such as that illustrated in FIG. 4, where B is the magnetic induction and H is the magnetizing force. The incremental induction, represented by the slope of curve 55, is maximum near the center of the curve, and is much less at the ends of the curve. The regions of large slope represent operating regions in which the inductor has a large reactive impedance, and the zero-slope regions at the ends of the curve represent regions in which the inductor has little or no reactive impedance. The magnetic core of the saturable inductor is selected in conjunction with the number and layout of turns in order to provide maximum induction and inductance at high rate of load current changes, and low or zero induction and inductance at low rate of current of load resistor 14. The relatively large inductance presented by the saturable inductor 50 of FIG. 3 to rapidly changing or surge currents tends to suppress surges. Thus, any of the phase correcting power-supply modules or units of set 28 which may tend to produce a surge current finds that such a surge is opposed by a reaction of saturable reactor 50. The opposition to the surge essentially suppresses the surge. Since the presence of saturable reactor 50 tends to suppress any surge currents flowing to the capacitive component 16 of load 12, the set 30 of current sharing controllers need not have soft-start characteristics. In general, the use of a single saturable reactor, such as reactor 50, will be cheaper and more reliable than the use of a soft-start controller. FIG. 8 is a simplified diagram illustrating a current sharing controller similar to that of FIG. 7, but in which the soft-start feature is absent, and the signal paths required for distributing startup signals to the various controllers are also absent.

Figure 5:
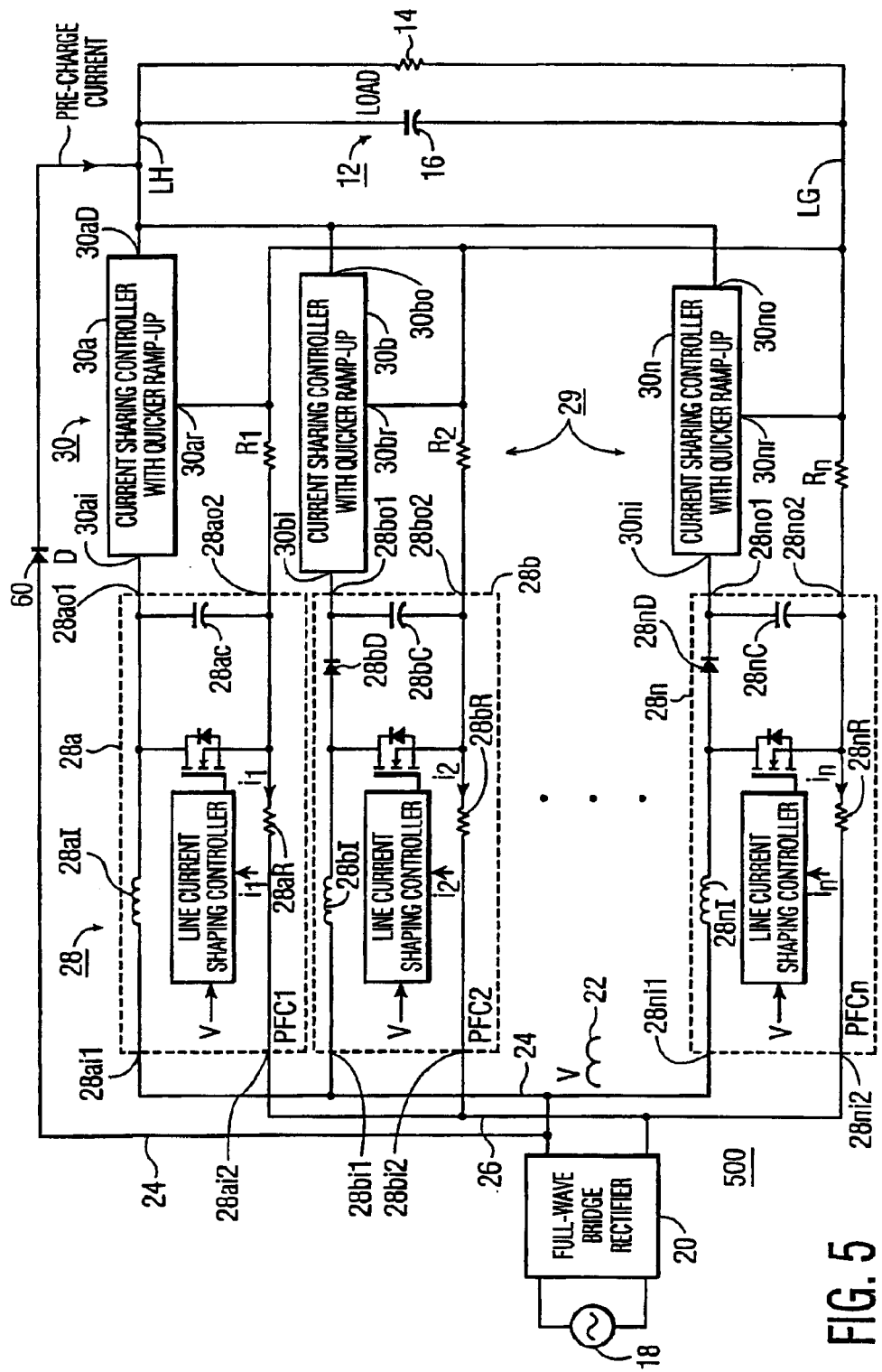

Circuit arrangement 500 of FIG. 5 is similar to circuit arrangement 10 of FIG. 1, and corresponding elements are designated by the same alphanumerics. Circuit arrangement 500 differs from circuit arrangement 10 by the addition of a precharging current path including a diode (D) 60. The precharging current path extends from conductor 24 at the output of full-wave bridge rectifier 20 to conductor LH adjacent the load 12. In operation at turn-on, the pulsating direct voltage 22 produced by rectifier 20 is immediately applied to the anode of diode 60, and current flows through diode 60 and load capacitance 16, thereby charging capacitance 16 even in the absence of significant voltage at the output terminals 28ao1, 28bo1, . . . , 28no1 of the set 28 of power-factor correcting modules. Thus, by the time the set 28 of power-factor correcting modules reaches a nominal output voltage and the set 30 of current sharing controllers couples the set 2B of power-factor correcting modules to load 12 by way of conductor LH, the load capacitance 16 is already at least partially charged. The precharge applied to load capacitance 16 tends to reduce the magnitude of surge currents which might occur when the current sharing controllers couple the power-factor correcting modules to the load.

It should be noted that if the power factor correction modules of set 28 of FIG. 5 are voltage boost modules producing a direct output voltage which exceeds the peak value of the pulsating direct voltage 22 produced by rectifier 20, the precharging path including diode or rectifier 60 will be turned OFF or become open-circuited, because the greater positive value of the direct voltage applied to the cathode of device 60 by comparison with the lesser positive value of the pulsating direct voltage 22 will result in reverse bias of the diode or rectifier. This arrangement avoids the need for a separate switch and timing circuit to disconnect the precharging path.

Figure 3:
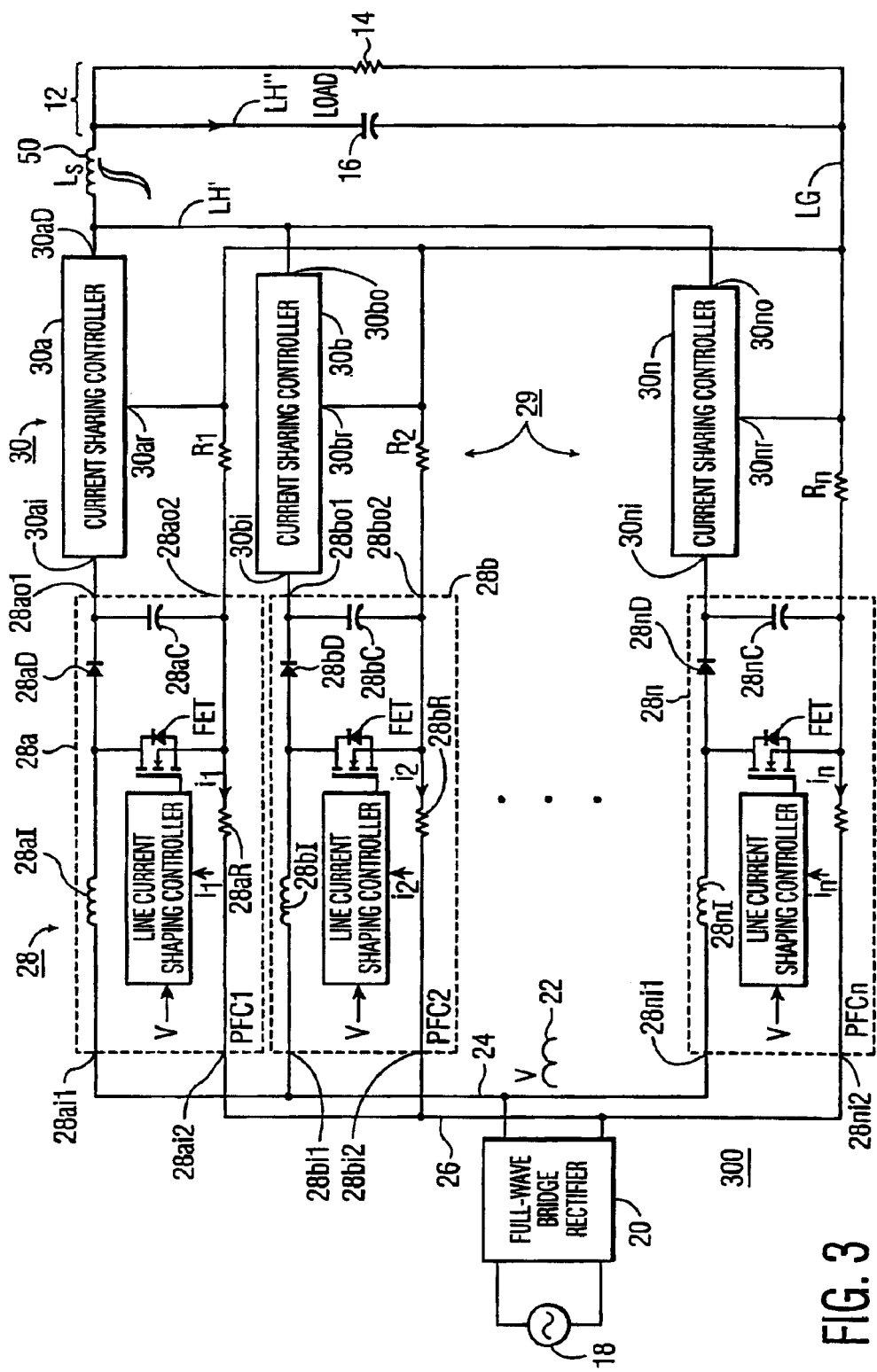
Figure 4:
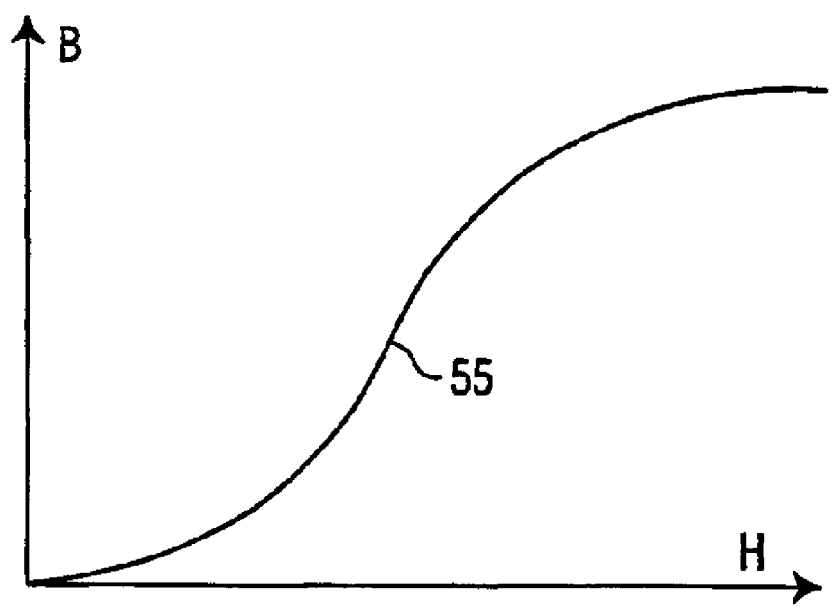
FIG. 4 is a simplified magnetization curve of a saturable material.
Figure 6:
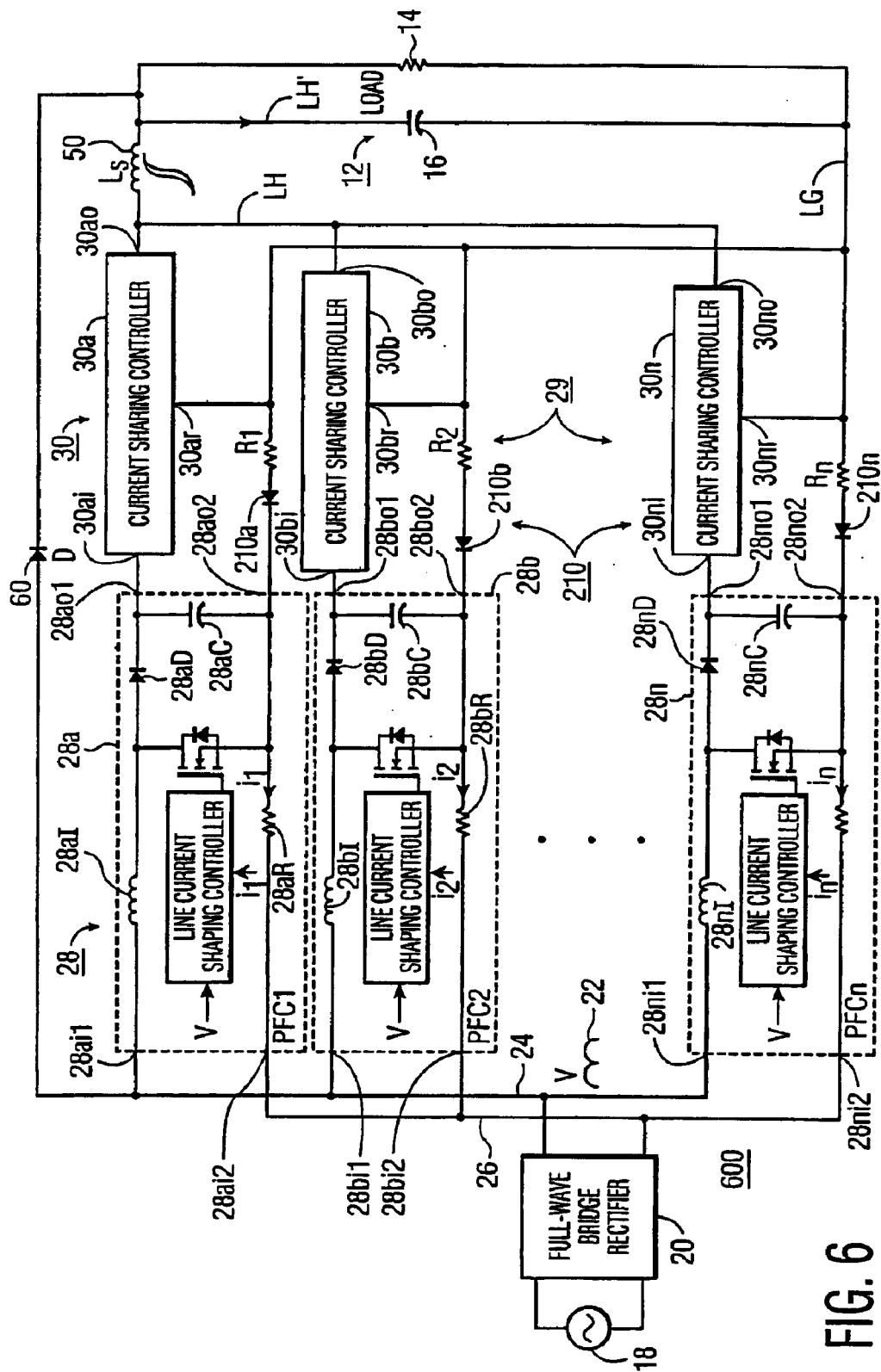
FIG. 6 is a simplified diagram illustrating a combination of the arrangements of FIGS. 2, 3, and 5.

FIG. 6 illustrates a circuit arrangement similar to that of FIG. 1, with the inclusion of a set 210 of unidirectional current conducting devices connected in a manner similar to that described in conjunction with FIG. 2, and also including a saturable reactor 50 as described in conjunction with FIGS. 3 and 4. In addition, the arrangement of FIG. 6 also includes a precharging device or path 60 corresponding to that of FIG. 5. These changes to the arrangement of FIG. 1 tend to improve the performance of the parallel supply.

An electrical apparatus (300) according to an aspect of the invention is for powering a load (12), which may include a capacitive component (16). The electrical apparatus (300) comprises a source (20) of pulsating direct voltage (22), and a first plurality (n) of power factor correcting AC-to-DC switching converters units (28a, 28b, . . . , 28n). Each of the power factor correcting AC-to-DC switching converters units (28a, 28b, . . . 8n) includes first (28ai*l*, 28bi*l*, . . . , 28ni1) and second (28ai2, 28bi2, . . . , 28ni2) input ports coupled to the source (20) of pulsating direct voltage (22), and also includes first (28ao1, 28bo1, . . . , 28no1) and second (28ao2, 28bo2, . . . , 28no2) output ports, and is for converting the pulsating direct voltage (22) into a direct voltage at the first (28ao1, 28bo1, . . . , 2Bno1) and second (28ao2, 28bo2, . . . , 2Bno2) output terminals, and for tending to maintain the current through the source (20) of pulsating direct voltage (22) in-phase with the pulsating direct voltage (22). Each of the power factor correcting AC-to-DC switching converter units (28a, 28b, . . 28n) further includes first unidirectional current conducting means (28aD, 28bD, . . . , 28nD), such as a diode or rectifier, associated with the first output port (28ao1, 28bo1, . . . , 28no1), for resisting retrograde flow of current at the first output port (28ao1, 28bo1, 28no1). The electrical apparatus (300) also includes a plurality, equal to the first plurality (n), of current sharing controllers (30a, 30b, . . . , 30n). Each of the current sharing controllers (30a, 30b, . . . , 30n) includes an input terminal (30ai, 30bi, . . . , 30ni) coupled to the first output terminal (28ao1, 28bo1, 0.28no1) of an associated one of the power factor correcting AC-to-DC switching converter units (28a, 28b, . . . 28n), and each of the current sharing controllers (30a, 30b, . . . , 30n) also includes a reference port (30ar, 30br, . . . , 30nr) in common with the reference ports of all the current sharing controllers (30a, 30b, . . . , 30n), and an output port (30ao, 30bo, . . . , 30no) in common with all output ports of the current sharing controllers (30a, 30b, . . . , 30n). An output return current equalizing impedance (R1, 201a; R2, 201b, . . . , Rn, 210n) is associated with the second output terminal of each of the power factor correcting AC-to-DC switching converter units (28a, 28b, . . . 28n). The equalizing impedance (R1, 201a; R2, 201b, . . . , Rn, 210n) comprises second unidirectional current conducting means (210a, 210b, . . . , 210n) poled for resisting forward flow of current at the associated first output port 28ao2, 28bo2, . . . , 28no2) of a power factor correcting AC-to-DC switching converter unit (28a, 28b, . . 28n).

In an advantageous embodiment of this aspect of the invention, each of the output return current equalizing impedances (R1, 201a; R2, 201b, . . . , Rn, 210n) comprises resistance means (R1, R2, . . . , Rn). In a preferred embodiment of this aspect of the invention, the power factor correcting AC-to-DC switching converter (28a, 28b, . . . 28n) units are boost power factor correcting AC-to-DC switching converter units. In a more preferred embodiment of this aspect of the invention, a controllable path (60) is coupled to the source (20) of pulsating direct voltage (22) and to the load (12), for tending to charge a capacitive component (16) of the load (12) at turn-on, and for ceasing the charge after turn-on. The controllable path (60) may include a controllable switch, where the controllable switch may include a unidirectional current conducting device which conducts when the pulsating direct voltage is greater than the voltage on the capacitive component (16) and which ceases conduction when the pulsating direct voltage is less than the voltage on the capacitive component (16). In one particularly advantageous version of this aspect of the invention, the power factor correction units (28a, 28b, . . . 28n) are voltage-boosting units which produce a direct voltage greater than the peak value of the pulsating direct voltage, which tends to turn OFF the controllable switch (60). A saturable reactor (50) may be connected between the combined output ports (30ao, 30bo, . . . , 30no) of the current sharing controllers (30a, 30b, . . . , 30n) and the load (12), for tending to oppose surge currents at turn-on.

What is claimed is:

1. An electrical apparatus for powering a load, said electrical apparatus comprising:
    a source of pulsating direct voltage;
    a first plurality of power factor correcting AC-to-DC switching converters units, each including first and second input ports coupled to said source of pulsating direct voltage, and each also including first and second output ports, each of said power factor correcting AC-to-DC switching converter units being for converting said pulsating direct voltage into a direct voltage at said first and second output terminals, and for tending to maintain the current through said source of pulsating direct voltage in-phase with said pulsating direct voltage, each of said power factor correcting AC-to-DC switching converter units further including first unidirectional current conducting means associated with said first output port for resisting retrograde flow of current at said first output port;

a plurality equal to said first plurality of current sharing controllers, each of which includes an input terminal coupled to said first output terminal of one of said power factor correcting AC-to-DC switching converter units, a reference port in common with all said current sharing controllers, and an output port in common with all output ports of said current sharing controllers; and an output return current equalizing impedance associated with said second output terminal of each of said power factor correcting AC-to-DC switching converter units, said equalizing impedance comprising second unidirectional current conducting means poled for resisting forward flow of current at the associated first output port.

2. An apparatus according to claim 1, wherein said power factor correcting AC-to-DC switching converter units are boost power factor correcting AC-to-DC switching converter units.

3. An apparatus according to claim 1, wherein each of said output return current equalizing impedances comprises resistance means.

4. An apparatus according to claim 1, further comprising a controllable path coupled to said source of pulsating direct voltage and to said load, for tending to charge a capacitive component of said load at turn-on, said controllable path ceasing said charge after turn-on.

5. An apparatus according to claim 4, wherein said controllable path includes a controllable switch.

6. An apparatus according to claim 5, wherein said controllable switch includes a unidirectional current conducting device which conducts when said pulsating direct voltage is greater than the voltage on said capacitive component and which ceases conduction when said pulsating direct voltage is less than said voltage on said capacitive component.

7. An apparatus according to claim 6, wherein said power factor correction units are voltage-boosting units which produce a direct voltage greater than the peak value of said pulsating direct voltage.

8. An apparatus according to claim 1, further comprising a saturable reactor coupled to said load and to said output port in common with all output ports of said current sharing controllers, for tending to present a high impedance to changes in load current during turn-on.

* * * * *